United States Patent
Staubli et al.

(10) Patent No.: US 6,767,649 B2
(45) Date of Patent: Jul. 27, 2004

(54) ROTOR FOR A TURBOMACHINE, AND PROCESS FOR PRODUCING A ROTOR OF THIS TYPE

(75) Inventors: Markus Staubli, Dottikon (CH); Hans Wettstein, Fislisbach (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/101,321

(22) Filed: Mar. 20, 2002

(65) Prior Publication Data

US 2002/0136659 A1 Sep. 26, 2002

(30) Foreign Application Priority Data

Mar. 23, 2001 (DE) .......................................... 101 14 612

(51) Int. Cl.$^7$ ................................................. B22F 7/04
(52) U.S. Cl. ...................... 428/553; 428/554; 428/555; 419/8
(58) Field of Search .............................. 428/553, 554, 428/555; 419/8, 5, 9

(56) References Cited

U.S. PATENT DOCUMENTS

| | | | |
|---|---|---|---|
| 3,967,919 A | * 7/1976 | Couloln et al. ......... 416/198 A |
| 4,333,670 A | 6/1982 | Holko | |
| 4,479,293 A | * 10/1984 | Miller et al. ........... 29/156.8 R |
| 4,485,961 A | * 12/1984 | Ekbom et al. ............... 228/193 |
| 4,486,385 A | 12/1984 | Aslund | |
| 4,680,160 A | * 7/1987 | Helmink .......................... 419/6 |
| 4,743,165 A | 5/1988 | Ulrich | |
| 4,942,322 A | * 7/1990 | Raybould et al. ........... 310/156 |
| 5,470,524 A | * 11/1995 | Krueger et al. ................ 419/5 |
| 6,120,727 A | * 9/2000 | Asaka et al. .................... 419/6 |
| 6,350,325 B1 | * 2/2002 | Ewald et al. ................ 148/325 |

FOREIGN PATENT DOCUMENTS

| | | |
|---|---|---|
| DE | 3241926 C2 | 5/1984 |
| DE | 19944522 A1 | 3/2000 |

* cited by examiner

*Primary Examiner*—Daniel Jenkins
(74) *Attorney, Agent, or Firm*—Burns, Doane, Swecker & Mathis, L.L.P.

(57) ABSTRACT

A rotor (10) for a turbomachine, comprising at least one first, preferably disk-like rotor section (12), which is exposed to high operating temperatures and consists of a particularly creep-resistant material, in particular a nickel-based alloy, and at least one second, preferably disk-like rotor section (11), which is exposed to lower operating temperatures and consists of a less creep-resistant material, in particular steel, the first and second rotor sections (11, 12) being joined to one another by welding. In a rotor of this type, a crack-free welded joint is achieved by the fact that, to join the two rotor sections (11, 12), a transition region (13) is arranged between the two rotor sections (11, 12), which transition region is produced by powder metallurgy, is welded to one of the two rotor sections (11, 12) at least on one side, and on this side has the same composition as the rotor section to which it is welded.

22 Claims, 4 Drawing Sheets

ROTOR FOR A TURBOMACHINE, AND PROCESS FOR PRODUCING A ROTOR OF THIS TYPE

FIELD OF THE INVENTION

The present invention deals with the field of turbomachine engineering. It relates to a rotor for a turbomachine in accordance with the preamble of claim 1 and to a process for producing a rotor of this type.

BACKGROUND OF THE INVENTION

The efficiency of a rotating thermal machine, for example of a gas turbine or the like, can be improved significantly by raising the operating temperature, for example to over 600° C. Rotors for use at temperatures of over 600° C., for example, should be produced from particularly creep-resistant materials, so that there is no need for complex rotor cooling. This applies in general to rotors for gas turbines, steam turbines, turbochargers, compressors and pumps. As the operating temperature increases, it is necessary to switch from low-alloy steels to higher-alloy martensitic steels, to austenitic steels and to nickel-based alloys, so that sufficient creep rupture strength is always ensured. However, nickel-based alloys are considerably more expensive than low-alloy steels. Therefore, to minimize the costs of a rotor, only the high-temperature region or section of the rotor should consist of the particularly creep-resistant materials, while the remaining regions (e.g. the rotor ends) can be produced from a suitable steel.

The production of a rotor of this type, which is usually welded together from a plurality of segments in disk or drum form, accordingly requires a join between different materials. The join can be produced by screwing or welding the parts together. A screw connection is exposed to excessive mechanical stresses. Although it has already been used for relatively small turbines, there is no experience of such arrangements in large turbines.

As has already been mentioned, when the parts of the rotor are being welded together, not only are welded joints between two elements made from the same material required, but also there is a need for welded joints between different materials. While the welded joints between elements made from the same material are relatively uncritical, problems arise when welding together elements made from different materials: the solidification of the weld pool under certain circumstances leads to the formation of cracks.

U.S. Pat. No. 4,333,670 has proposed the use of a transition joint, which involves arranging a multiplicity of transition parts which have been welded together, each have a specific material composition and allow stepwise matching of the two tubular parts which are to be joined to one another, for the purpose of joining tubular parts made from a low-alloy carbon steel and a high-temperature alloy with a high chromium content. However, the production of a transition joint of this type, comprising numerous parts which have been welded together, is extremely complex, in particular in the case of large dimensions. Furthermore, a transition joint of this type takes up a considerable amount of space between the parts which are to be joined, and this space is not available in a rotor.

In U.S. Pat. No. 4,743,165, a special welding process ("inertia welding") is used during the production of a rotor of a gas turbine in which disks of a superalloy (IN100) are welded to sealing parts made from a different alloy (IN718). There is no provision for parts made from a superalloy to be joined to parts made from a steel.

Finally, it is proposed, in U.S. Pat. No. 4,486,385, for annular elements which consist of different steels to be joined by welding through the use of a tubular transition piece which is produced by powder metallurgy methods and has a composition which varies over its length and at each end corresponds to the composition of the respective annular element which is to be joined. There is no provision for a welded joint between steel parts and parts made from a nickel-based alloy.

SUMMARY OF THE INVENTION

It is an object of the invention to provide a rotor for a turbomachine which, even without complex cooling, is suitable for elevated operating temperatures and is welded together, without loss of mechanical strength, from parts which consist of particularly creep-resistant and less creep-resistant materials, and to describe a process for producing a rotor of this type.

The object is achieved by the combination of features described in claims 1 and 10. The essence of the invention consists in providing, for the welded joint between two parts or sections, of which one consists of a less creep-resistant material and the other consists of a particularly creep-resistant material, a transition region which has been produced by powder metallurgy and, on the side at which the transition region is welded to one of the parts or sections, has precisely the composition of the adjoining part or section. The fact that the transition region, on the respective side of the welded joint, is matched, in terms of its composition, to the part which is welded on results in a secure welded joint which can withstand high mechanical loads. The transition region can be produced in a space-saving and relatively simple manner.

According to a first embodiment of the invention, the transition region is welded to one part on only one side, while on the other side it is joined to the other part of the joint by powder metallurgy.

In particular, the transition region is a layer of a less creep-resistant material, the composition of which corresponds to that of the second rotor section. The layer is joined to the first rotor section by powder metallurgy and is welded to the second rotor section. The first rotor section may optionally likewise be produced by powder metallurgy or may be forged.

However, it is also possible for the transition region to be a layer of a particularly creep-resistant material, the composition of which corresponds to that of the first rotor section. The layer is in this case joined to the second rotor section by powder metallurgy and is welded to the first rotor section.

According to a second preferred embodiment, the transition region is formed by a separate transition piece which is welded to both rotor sections, the composition of the transition piece being position-dependent and, on the side facing the first rotor section, corresponding to the composition of the first rotor section and, on the side facing the second rotor section, corresponding to the composition of the second rotor section.

In particular, the transition piece may be in the form of a ring or an unperforated or perforated disk.

The less creep-resistant material may be steel while the particularly creep-resistant material may be a nickel-based alloy.

A first preferred embodiment of the process according to the invention is characterized in that the transition region is a layer of a less creep-resistant material, which corresponds to the second rotor section, and in that the layer and the first rotor section are produced together by powder metallurgy.

A second preferred embodiment of the process according to the invention is characterized in that the transition region is a layer of a less creep-resistant material, which corresponds to the second rotor section, and in that the layer is applied to the first rotor section by powder metallurgy.

A third preferred embodiment of the process according to the invention is characterized in that the transition region is a layer of a particularly creep-resistant material, which corresponds to the first rotor section, and in that the layer and the second rotor section are produced together by powder metallurgy.

A fourth preferred embodiment of the process according to the invention is characterized in that the transition region is a layer of a particularly creep-resistant material, which corresponds to the first rotor section, and in that the layer is applied to the second rotor section by powder metallurgy.

A further embodiment of the process according to the invention is distinguished by the fact that, to form the transition region, first of all a separate transition piece is produced by powder metallurgy, which transition piece has a position-dependent composition, such that the composition, on the side facing the first rotor section, corresponds to the composition of the first rotor section and, on the side facing the second rotor section, corresponds to the composition of the second rotor section, and that the transition piece is then welded to the two rotor sections.

To test the weld seams, it is advantageous if, first of all, the transition piece is welded to the first rotor section, and the associated weld seam undergoes nondestructive testing, in particular by means of X-rays, before the transition piece is welded to the second rotor section.

Further embodiments will emerge from the dependent claims.

BRIEF DESCRIPTION OF THE DRAWINGS

The invention is to be explained in more detail below with reference to exemplary embodiments and in conjunction with the drawing, in which.

DETAILED DESCRIPTION OF THE INVENTION

The idea on which the invention is based consists in using, for the welded joint between the parts which consist of the less creep-resistant material, for example steel, and the parts which consist of the particularly creep-resistant material, e.g. a nickel-based alloy, a transition piece in which the material composition changes from that of the less creep-resistant material or steel at one end of the transition piece into that of the particularly creep-resistant material or nickel-based alloy at the other end of the transition piece. The transition piece is produced by powder metallurgy.

Figure 6:
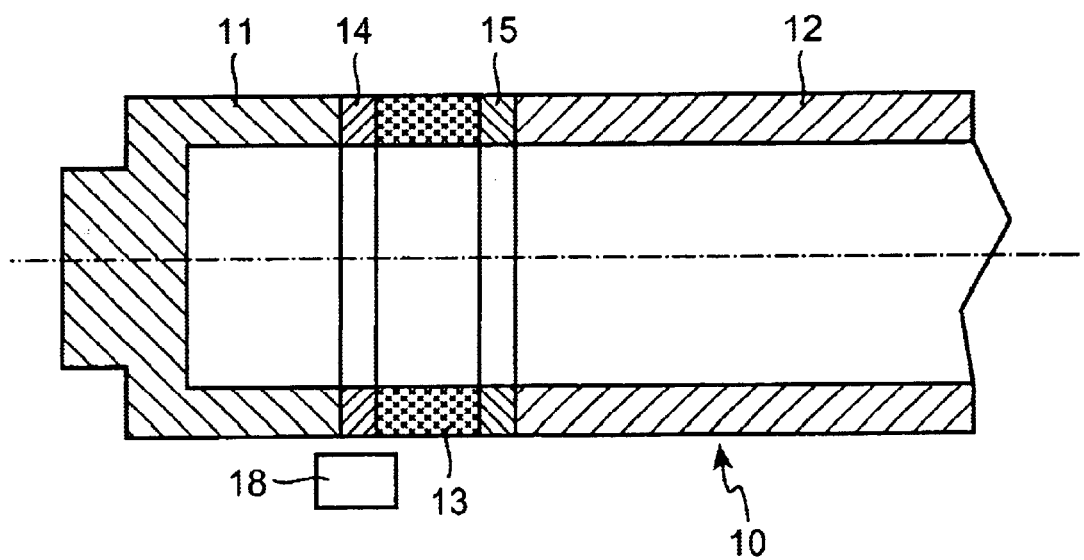
FIG. 6 shows the welding of the transition piece to the rotor section (e.g. rotor end) which consists of the less creep-resistant material and the nondestructive testing of the weld seam by means of ultrasound.

A disk-like or drum-like transition piece 13 is required for a rotor 10 (illustrated in FIG. 6) of a gas turbine, in which a high-temperature-resistant first rotor section 12 made from a nickel-based alloy is joined to a second rotor section 11, which is exposed to less high temperatures, by welding. On the left-hand side, the transition piece 13 is welded to the rotor section 11 by means of a first weld seam 14, and on the right-hand side the transition piece 13 is welded to the rotor section 12 via a second weld seam 15. Of course, it is also possible for rotors of steam turbines, turbochargers, compressors or pumps to be constructed in the same way.

Figure 1:
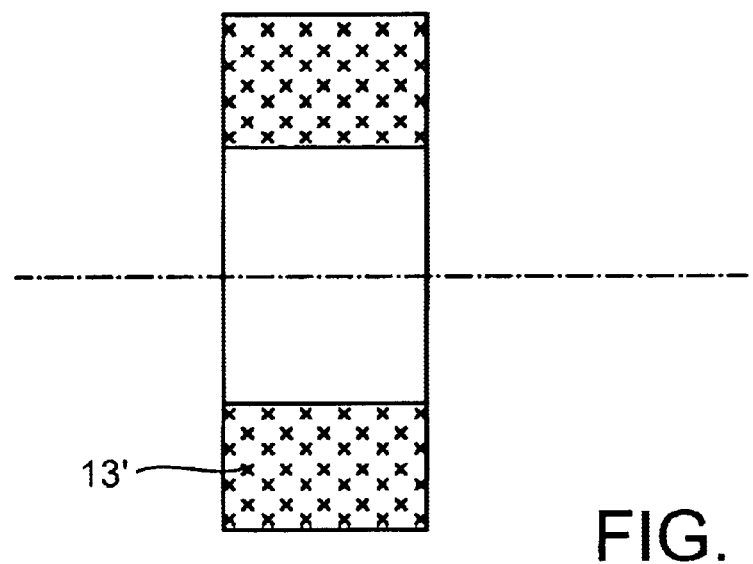
FIG. 1 diagrammatically depicts a longitudinal section through a transition piece, which has been produced by powder metallurgy, for a rotor according to the invention before the hot isostatic pressing.

To produce the transition piece 13, first of all, as shown in FIG. 1, a preform 13' is produced, in which a powder comprising the steel and a powder comprising the nickel-based alloy are mixed with one another in such a way that the end which faces the rotor section 11 consists of 100% steel powder and the end which faces the rotor section 12 consists of 100% powder of the nickel-based alloy, while between the two ends, the levels of steel powder and of the nickel-based alloy powder change continuously. It is important for the transition piece 13 to be produced without melting, in order to avoid the formation of cracks during solidification. The axial length of the transition piece 13 should be kept short, so that the rotor 10 is not unnecessarily lengthened, but should not be so short that the heat-affected zones of the two welds overlap. There should be no blade or vane securing means in the transition zone. Rather, at this location a guide vane may be secured in the opposite housing part.

Figure 2:
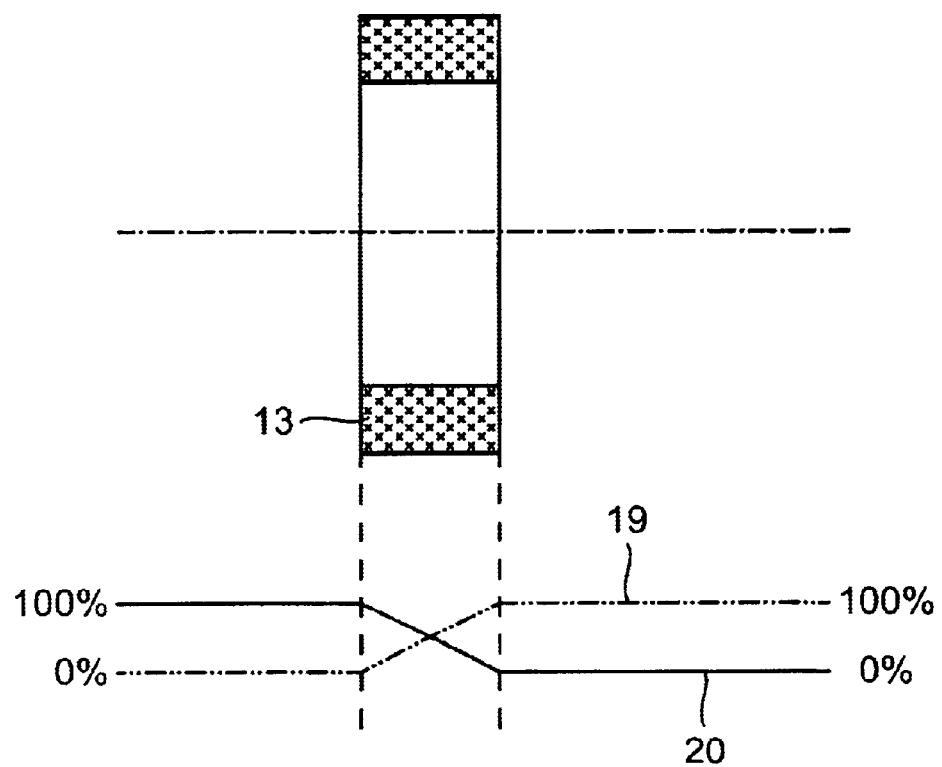
FIG. 2 shows the transition piece from FIG. 1, after the hot isostatic pressing, and an associated position-dependent profile of the composition, which is given by way of example.

The 100% compacted transition piece 13 as shown in FIG. 2 is produced from the preform 13' by hot isostatic pressing (HIP) at high temperatures and pressures, followed by a heat treatment. In the transition piece 13, the level of steel decreases, from the left to the right in accordance with curve 20, for example in linear fashion, from 100% to 0%, while the level of nickel-based alloy increases, as shown by curve 19, in correspondingly linear fashion from 0% to 100%.

Figure 3:
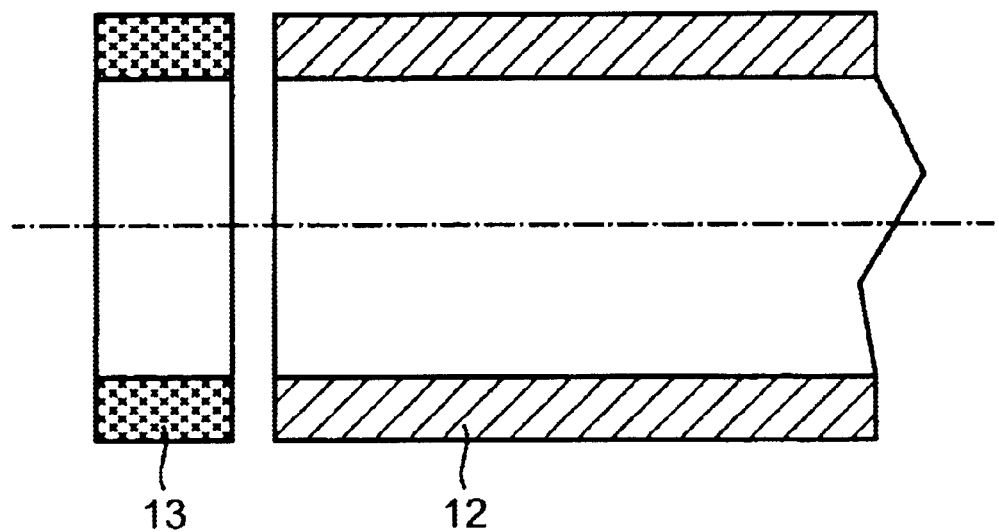
FIGS. 3 and 4 show the welding of the transition piece from FIG. 2 to the high-temperature-resistant rotor section.
Figure 4:
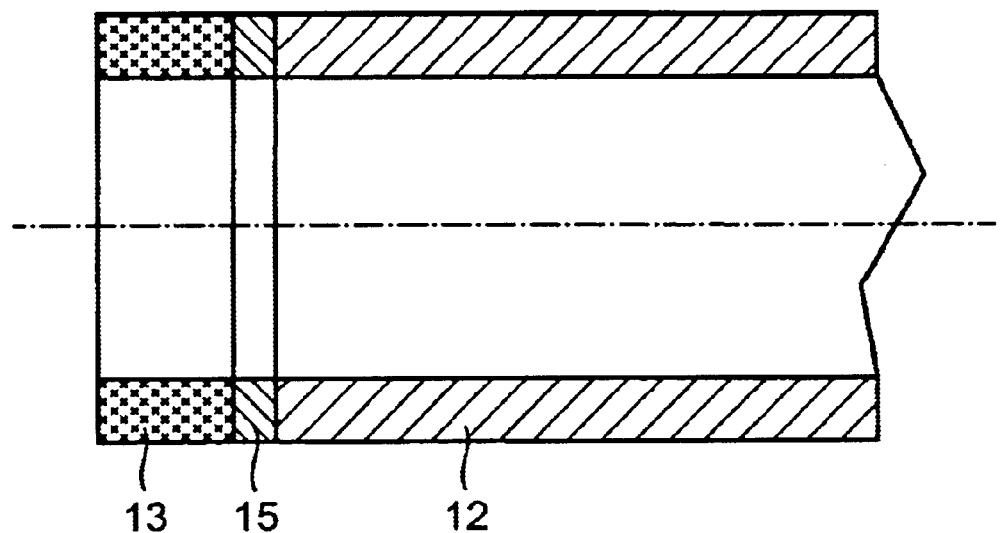
Figure 5:
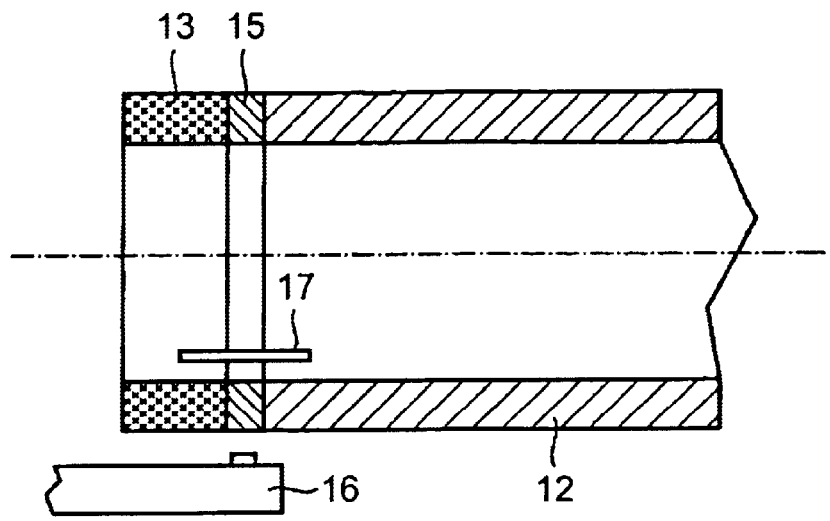
FIG. 5 shows the nondestructive testing of the weld seam produced in accordance with FIG. 4 by means of X-ray images.

Then, as shown in FIGS. 3 and 4, the right-hand end, which consists of 100% nickel-based alloy, of the finished transition piece 13 is welded to the rotor section 12 made from the nickel-based alloy, using a suitable welding electrode. This allows the formation of a crack-free weld seam 15.

It is important to note that the welded joint formed from the nickel-based alloys, i.e. the weld seam 15, cannot satisfactorily undergo nondestructive testing by means of ultrasound, on account of the sound absorption of the material. Therefore, the testing has to be carried out using X-ray images, which require access to both sides (inner and outer side) of the welded joint. For this reason, first of all only the welded joint between the transition piece 13 and the rotor section 12 is produced. The weld seam 15 of this joint is then tested by X-ray images in accordance with the figure, during which testing, by way of example, an X-ray source 16 radiates through the weld seam 15 from the outside, and images are taken by means of an internally arranged X-ray film.

After testing of the weld seam 15, the rotor section 11, which consists of steel, is welded to the "steel end" of the transition piece 13 using a steel electrode, and the weld seam 14 which has been produced is then subjected to nondestructive testing by means of an ultrasound test head 18. Since in this case access to the interior of the rotor 10 is not required, there are no difficulties even if the rotor section 11 is a (closed) rotor end.

However, other variants of the welded joint are also conceivable within the scope of the invention, in which variants, instead of the separately produced transition piece 13, layers (21, 22 in FIGS. 7 and 8, respectively) are used which are applied by powder metallurgy to the joining surface of one of the two rotor sections 11, 12 which are to be joined and are joined to this joining surface, and the free surfaces of these layers are welded to the respective other rotor section.

Figure 7:
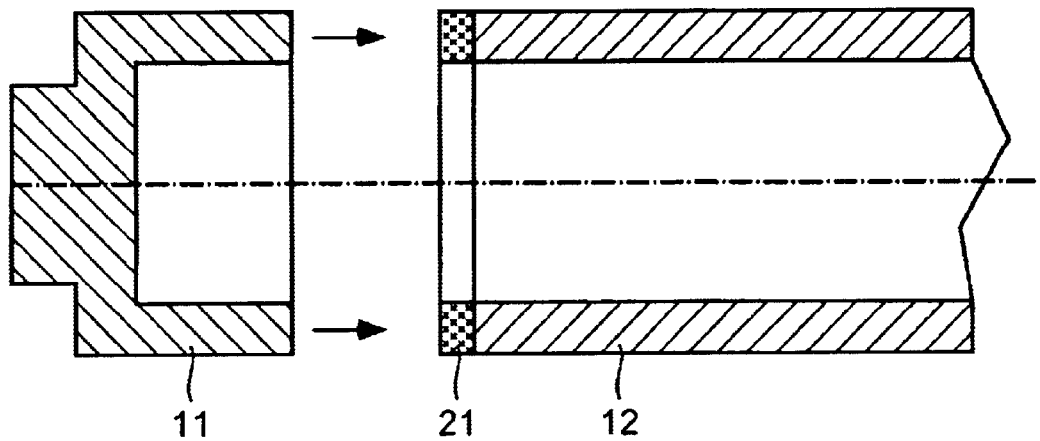
FIG. 7 shows an alternative process with a transition region in the form of a layer which consists of powder of a less creep-resistant material and is joined by powder metallurgy to the rotor section which consists of the particularly creep-resistant material.

In FIG. 7, the rotor section 12 made from the nickel-based alloy is provided with a layer 21 of steel powder by powder metallurgy. This can be achieved either by producing the rotor section 12 and the layer 21 together by powder metallurgy or by the layer 21 being applied to the finished forged rotor section 12 by means of hot isostatic pressing.

The two parts which have been prepared in this way can then be welded by means of a steel electrode and the weld seam can be tested by ultrasound (from the outside).

Figure 8:
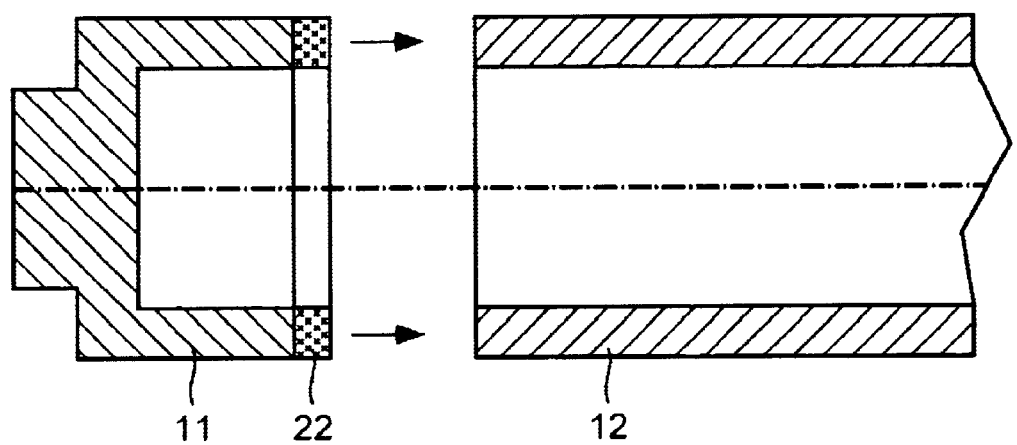
FIG. 8 shows a further alternative process having a transition region in the form of a layer which consists of the powder of the particularly creep-resistant material and is joined by powder metallurgy to the rotor section which consists of the less creep-resistant material.

However, as shown in FIG. 8, it is also conceivable, in a similar manner to FIG. 7, for the rotor section 11 made from steel to be provided by powder metallurgy with a layer 22 of the nickel-based alloy, it being possible for the rotor section 11 to be produced at the same time by powder metallurgy or beforehand in some other way. The welding between two surfaces made from the nickel-based alloy then takes place by means of a weld metal of the same composition as the base. This variant is less favorable with regard to the nondestructive testing of the weld seam if the rotor section 11 is a rotor end and, on account of the lack of access to the interior, an X-ray test cannot be carried out. However, an advantage is the fact that the weld comprising nickel-based alloy has a higher strength at operating temperature than a weld metal comprising steel.

LIST OF REFERENCE SYMBOLS

10 Rotor (turbomachine)
11 Rotor section (with reduced operating temperature)
12 Rotor section (with high operating temperature)
13 Transition piece
13' Preform (transition piece)
14,15 Weld seam
16 X-ray source
17 X-ray film
18 Ultrasound test head
19 Curve indicating the level of the particularly creep-resistant material (e.g. nickel-based alloy)
20 Curve indicating the level of the less creep-resistant material (e.g. steel)
21,22 Powder-metallurgy layer

What is claimed is:

1. A rotor for a turbomachine, comprising:
   at least one first rotor section, which is exposed to high operating temperatures and consists of a particularly creep-resistant material; and
   at least one second rotor section, which is exposed to lower operating temperatures and consists of a less creep-resistant material,
   wherein, to join the two rotor sections, a transition region is arranged between the two rotor sections, which transition region is produced by powder metallurgy, is welded to one of the two rotor sections at least on one side, and on this side has the same composition as the rotor section to which it is welded.

2. The rotor as claimed in claim 1, wherein the less creep-resistant material is steel.

3. The rotor as claimed in claim 2, wherein the transition region is a layer of steel, the composition of which corresponds to that of the second rotor section, and wherein the layer is joined to the first rotor section by powder metallurgy and is welded to the second rotor section.

4. The rotor as claimed in claim 3, wherein the first rotor section is produced by powder metallurgy.

5. The rotor as claimed in claim 3, wherein the first rotor section is forged.

6. The rotor as claimed in claim 1, wherein the transition region is a layer of a particularly creep-resistant material, the composition of which corresponds to that of the first rotor section, and wherein the layer is joined to the second rotor section by powder metallurgy and is welded to the first rotor section.

7. The rotor as claimed in claim 1, wherein the transition region is formed by a separate transition piece which is welded to both rotor sections, and wherein the composition of the transition piece is position-dependent and, on the side facing the first rotor section, corresponds to the composition of the first rotor section and, on the side facing the second rotor section, corresponds to the composition of the second rotor section.

8. The rotor as claimed in claim 7, wherein the transition piece is in the form of a ring or an unperforated or perforated disk.

9. The rotor as claimed in claim 1, wherein the particularly creep-resistant material is a nickel-based alloy.

10. A process for producing the rotor as claimed in claim 1, wherein the transition region is produced from a metal powder of appropriate composition by hot isostatic pressing (HIP).

11. The process as claimed in claim 10, wherein the transition region is a layer of a less creep-resistant material, which corresponds to the second rotor section, and wherein the layer and the first rotor section are produced together by powder metallurgy.

12. The process as claimed in claim 10, wherein the transition region is a layer of a less creep-resistant material, which corresponds to the second rotor section, and wherein the layer is applied to the first rotor section by powder metallurgy.

13. The process as claimed in claim 10, wherein the transition region is a layer of a particularly creep-resistant material, which corresponds to the first rotor section, and wherein the layer and the second rotor section are produced together by powder metallurgy.

14. The process as claimed in claim 10, wherein the transition region is a layer of a particularly creep-resistant material, which corresponds to the first rotor section, and wherein the layer is applied to the second rotor section by powder metallurgy.

15. The process as claimed in claim 10, wherein, to form the transition region, first of all a separate transition piece is produced by powder metallurgy, which transition piece has a position-dependent composition, such that the composition, on the side facing the first rotor section, corresponds to the composition of the first rotor section and, on the side facing the second rotor section, corresponds to the composition of the second rotor section, and wherein the transition piece is then welded to the two rotor sections.

16. The process as claimed in claim 12, wherein, first of all, the transition piece is welded to the first rotor section, and wherein the associated weld seam undergoes nondestructive testing, in particular by means of X-rays, before the transition piece is welded to the second rotor section.

17. The rotor as claimed in claim 1, wherein the first rotor section is disk shaped.

18. The rotor as claimed in claim 1, wherein the second rotor section is disk shaped.

19. The process as claimed in claim 11, wherein the less creep-resistant material is steel.

20. The process as claimed in claim 12, wherein the less creep-resistant material is steel.

21. The process as claimed in claim 13, wherein the particularly creep-resistant material is a nickel-based alloy.

22. The process as claimed in claim 14, wherein the particularly creep-resistant material is a nickel-based alloy.

* * * * *